(12) United States Patent  
Sakata et al.

(10) Patent No.: US 8,678,596 B2  
(45) Date of Patent: Mar. 25, 2014

(54) ILLUMINATION DEVICE AND PROJECTOR WITH FLUORESCENT PLATE

(75) Inventors: Hidefumi Sakata, Tatsuno-cho (JP); Shunji Kamijima, Hara-mura (JP); Akira Miyamae, Fujimi-machi (JP); Shuji Narimatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 321 days.

(21) Appl. No.: 13/046,203

(22) Filed: Mar. 11, 2011

(65) Prior Publication Data

US 2011/0228232 A1 Sep. 22, 2011

(30) Foreign Application Priority Data

Mar. 18, 2010 (JP) ................................. 2010-062090

(51) Int. Cl.
| | |
|---|---|
| G02B 5/20 | (2006.01) |
| F21V 9/00 | (2006.01) |
| H04N 9/31 | (2006.01) |
| G02F 1/1335 | (2006.01) |
| G03B 21/14 | (2006.01) |

(52) U.S. Cl.  
USPC .................. 353/31; 353/84; 353/98; 313/506; 362/231; 362/293; 348/744; 348/342; 348/743; 349/7; 359/359; 359/491.01

(58) Field of Classification Search  
USPC .......... 353/31, 84, 98; 313/506; 362/231, 293; 348/744, 342, 743; 349/7; 359/359, 359/491.01  
See application file for complete search history.

(56) References Cited

U.S. PATENT DOCUMENTS

| | | | | |
|---|---|---|---|---|
| 6,147,720 | A * | 11/2000 | Guerinot et al. | 348/744 |
| 7,871,168 | B2 * | 1/2011 | Liu et al. | 353/84 |
| 2006/0007407 | A1 * | 1/2006 | Matsui | 353/84 |
| 2009/0284148 | A1 * | 11/2009 | Iwanaga | 313/506 |
| 2010/0328617 | A1 | 12/2010 | Masuda | |
| 2011/0149549 | A1 | 6/2011 | Miyake | |

FOREIGN PATENT DOCUMENTS

| | | |
|---|---|---|
| JP | A-2009-277516 | 11/2009 |
| JP | A-2011-013315 | 1/2011 |
| JP | A-2011-075657 | 4/2011 |
| JP | A-2011-129354 | 6/2011 |
| JP | A-2011-129406 | 6/2011 |

* cited by examiner

Primary Examiner — Tony Ko  
Assistant Examiner — Magda Cruz  
(74) Attorney, Agent, or Firm — Oliff PLC

(57) ABSTRACT

An illumination device includes: a light source device adapted to emit an excitation light beam; and a rotating fluorescent plate having a single fluorescent layer adapted to convert a part or whole of the excitation light beam into a fluorescent light beam. The fluorescent light beam includes two or more colored light beams, and the single fluorescent layer is formed on a circular disk, which can be rotated by a motor, continuously along a circumferential direction of the circular disk.

20 Claims, 10 Drawing Sheets

FIG. 2A
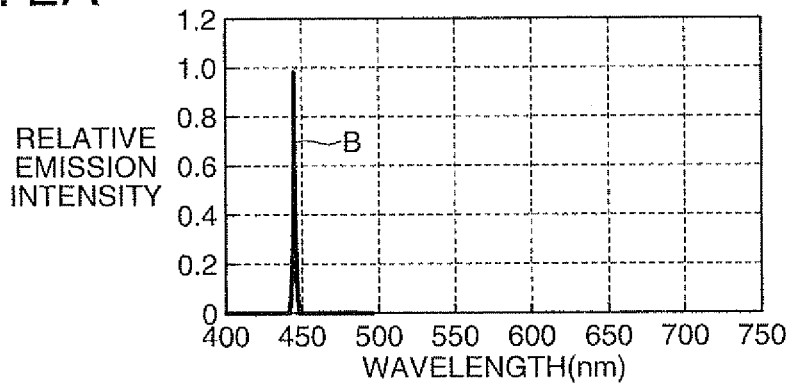
FIG. 2B
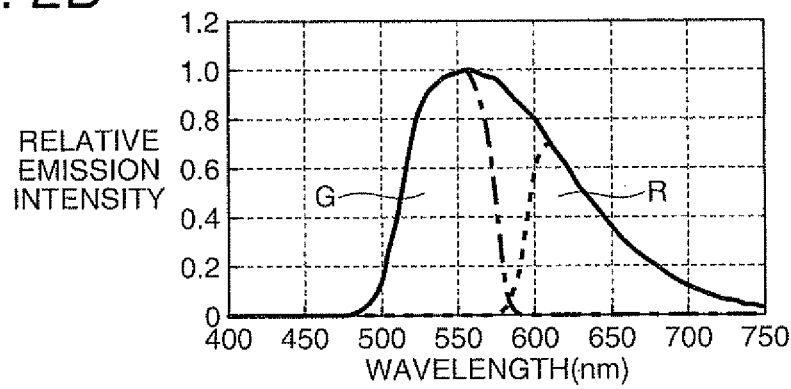
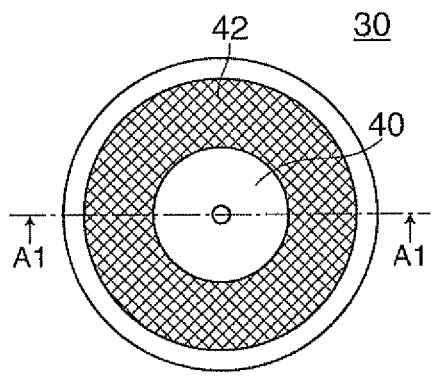
FIG. 3A
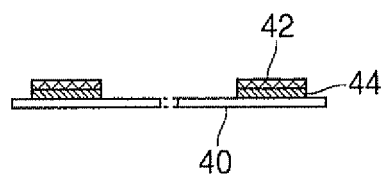
FIG. 3B

ILLUMINATION DEVICE AND PROJECTOR WITH FLUORESCENT PLATE

BACKGROUND

1. Technical Field

The present invention relates to an illumination device and a projector.

2. Related Art

In the past, as an illumination device used for a projector, there has been known an illumination device having a light source device for emitting the excitation light (blue light), and a rotating fluorescent plate obtained by providing three segment areas to a circular disk, which can be rotated by an electric motor, and is provided with two types of fluorescent layers emitting light beams with respective colors different from each other (a red light beam and a green light beam) respectively in the two segment areas thereof (see, e.g., JP-A-2009-277516). It should be noted that the remaining segment area out of the three segment areas provided with no fluorescent layer is provided with a scattering layer for scattering the excitation light (the blue light) at a predetermined scattering intensity.

According to the illumination device of the related art, it becomes possible to obtain a plurality of colored light beams (the red light beam, the green light beam, and the blue light beam) using the light source device for emitting the excitation light.

However, in the illumination device of the related art, since the two types of fluorescent layers need to be formed on the circular disk, there arises a problem that the manufacturing process of the rotating fluorescent plate becomes complicated.

Further, in the illumination device of the related art, since the types of the colored light beams emitted from the illumination device are sequentially switched at high rate in accordance with the rotation of the rotating fluorescent plate, there exists a problem that it is difficult to apply the illumination device to the liquid crystal projector "of a non-color sequential type having a strong characteristic of being capable of projecting a gentle image with no color breakup phenomenon and being capable of performing fine gradation expression to thereby be capable of projecting a natural image."

SUMMARY

An advantage of the invention is to provide an illumination device, which can obtain a plurality of colored light beams using the light source device for emitting the excitation light, can make the manufacturing process of the rotating fluorescent plate relatively simple, and can be applied to a liquid crystal projector. Further, the invention has an advantage of providing a projector equipped with such an illumination device.

1. According to an aspect of the invention, there is provided an illumination device including a light source device adapted to emit an excitation light beam, and a rotating fluorescent plate having a single fluorescent layer formed on a circular disk, which can be rotated by a motor, continuously along a circumferential direction of the circular disk. The single fluorescent layer converts a part or whole of the excitation light beam into a fluorescent light beam that includes two or more colored light beams.

Therefore, according to the illumination device of this aspect of the invention, since there are provided the light source device for emitting the excitation light and the rotating fluorescent plate provided with the fluorescent layer for converting a part or the whole of the excitation light into the fluorescent light that includes two or more colored light beams, it becomes possible to obtain the a plurality of colored light beams using the light source for emitting the excitation light.

Further, according to the illumination device of this aspect of the invention, since the rotating fluorescent plate provided with a single fluorescent layer is used, it becomes possible to make the manufacturing process of the rotating fluorescent plate relatively simple.

Further, according to the illumination device of this aspect of the invention, since there is used the rotating fluorescent plate having the single fluorescent layer formed continuously along the circumference direction of the circular plate, it results in that the same colored light beam is always emitted from the illumination device, and as a result, it becomes possible for the illumination device to be applied to the liquid crystal projector of the non-colorsequential type having strong characteristics.

Further, according to the illumination device of this aspect of the invention, since there is provided the rotating fluorescent plate obtained by providing the single fluorescent layer to the rotatable circular plate, the heat generated in the fluorescent layer due to the irradiation with the excitation light can be radiated in a large area along the circumferential direction, and as a result, it becomes possible to prevent the deterioration of the fluorescent layer and degradation of the luminous efficiency due to overheat of the fluorescent layer.

2. In the illumination device of the above aspect of the invention, it is preferable that the light source device emits a blue light beam as the excitation light beam, and the fluorescent layer converts a part of the blue light beam emitted from the light source device into the fluorescent light beam that includes a red light beam and a green light beam, and transmits a part of a remaining part of the blue light beam without performing the conversion.

By adopting such a configuration as described above, it becomes possible to emit the white light beam from the illumination device using the light source device for emitting the blue light beam.

3. In the illumination device of the above aspect of the invention, it is preferable that the light source device emits one of a violet light beam and an ultraviolet light beam as the excitation light beam, and the fluorescent layer converts the one of the violet light beam and the ultraviolet light beam emitted from the light source device into the fluorescent light beam that includes a red light beam, a green light beam, and a blue light beam.

By adopting such a configuration as described above, it becomes possible to emit the white light beam from the illumination device using the light source device for emitting the violet light beam or the ultraviolet light beam.

4. In the illumination device of the above aspect of the invention, it is preferable that the light source device emits a blue light beam as the excitation light beam, and the fluorescent layer converts the blue light beam emitted from the light source device into the fluorescent light beam that includes a red light beam and a green light beam.

By adopting such a configuration as described above, it becomes possible to emit the light beam including the red light beam and the green light beam from the illumination device using the light source device for emitting the blue light beam.

5. In the illumination device of the above aspect of the invention, it is preferable that the circular disk is made of a material transmitting the excitation light beam, the fluorescent layer is formed on the circular disk via a dichroic film adapted to transmit the excitation light beam and to reflect the fluorescent light beam, and the excitation light beam is arranged to enter the rotating fluorescent plate from a side of the circular disk.

By adopting such a configuration as described above, it becomes possible to emit the illumination light beam from the illumination device using the so-called transmissive rotating fluorescent plate.

6. In the illumination device of the above aspect of the invention, it is preferable that the fluorescent layer is formed on the circular disk via a reflecting film adapted to reflect a visible light beam, and the excitation light beam is arranged to enter the rotating fluorescent plate from a side of the fluorescent layer.

By adopting such a configuration as described above, it becomes possible to emit the illumination light beam from the illumination device using the so-called reflective rotating fluorescent plate.

7. In the illumination device of the above aspect of the invention, it is preferable that a light collection optical system disposed in a light path from the light source device to the rotating fluorescent plate, and adapted to make the excitation light beam enter the fluorescent layer in a roughly focused state is further provided.

By adopting such a configuration, it becomes possible to emit the fluorescent light in a small area, and as a result, it becomes possible to improve the light efficiency.

It should be noted that it is preferable that the light collection optical system makes the excitation light beam enter the fluorescent layer so as to fit the square 5 mm on a side, preferably 1 mm on a side.

8. In the illumination device of the above aspect of the invention, it is preferable that the rotating fluorescent plate rotates at a rotational speed at which a focused spot of the excitation light beam moves on the fluorescent layer at a predetermined relative speed in a range of 5 m/sec through 50 m/sec.

By adopting such a configuration, since the focused spot of the excitation light beam moves on the fluorescent layer at sufficiently high relative speed, it becomes possible to reduce the temperature rise caused in the fluorescent layer due to the irradiation with the excitation light to extremely low level, and as a result, it becomes possible to better prevent the deterioration of the fluorescent layer and the degradation of the luminous efficiency due to the overheat of the fluorescent layer. It should be noted that it becomes difficult to sufficiently reduce the temperature rise in the fluorescent layer at the rotational speed lower than 5 m/sec. Further, the rotational speed higher than 50 m/sec increases the noise and the load of the electric motor.

It should be noted that it is preferable that the rotating fluorescent plate rotates at a rotational speed at which a focused spot of the excitation light beam moves on the fluorescent layer at a predetermined relative speed in a range of 9 m/sec through 35 m/sec.

9. In the illumination device of the above aspect of the invention, it is preferable that the light source device is formed of a laser source.

By adopting such a configuration, since the laser source capable of instantaneous lighting is used as the light source, it becomes possible to project the projection image immediately after powering on.

Further, since the laser source with high light collecting power is used as the light source, it becomes possible to emit the fluorescent light in a smaller area, and as a result, it becomes possible to better improve the light efficiently.

10. According to another aspect of the invention, there is provided a projector including the illumination device according to one of the above aspect of the invention, a light modulation device adapted to modulate an illumination light beam emitted from the illumination device in accordance with image information, and a projection optical system adapted to project the modulated light emitted from the light modulation device as a projection image.

Therefore, according to the projector of this aspect of the invention, it becomes possible to provide a projector, which can obtain a plurality of colored light beams using the light source device for emitting the excitation light, can make the manufacturing process of the rotating fluorescent plate relatively simple, and can be realized as a liquid crystal projector.

11. In the projector of the above aspect of the invention, it is preferable that the light source device emits a blue light beam as the excitation light beam, and the fluorescent layer converts a part of the blue light beam emitted from the light source device into the fluorescent light beam that includes a red light beam and a green light beam, and transmits a part of a remaining part of the blue light beam without performing the conversion.

By adopting such a configuration as described above, it becomes possible to project a full-color image using the light source device for emitting the blue light beam.

12. In the projector of the above aspect of the invention, it is preferable that the light source device emits one of a violet light beam and an ultraviolet light beam as the excitation light beam, and the fluorescent layer converts the one of the violet light beam and the ultraviolet light beam emitted from the light source device into the fluorescent light beam that includes a red light beam, a green light beam, and a blue light beam.

By adopting such a configuration as described above, it becomes possible to project a full-color image using the light source device for emitting the violet light beam or the ultraviolet light beam.

13. In the projector of the above aspect of the invention, it is preferable that a second illumination device adapted to emit a blue light beam is further provided, the light source device emits a blue light beam as the excitation light beam, and the fluorescent layer converts the blue light beam emitted from the light source device into the fluorescent light beam that includes a red light beam and a green light beam.

By adopting such a configuration, it becomes possible to project the full-color image using the illumination device for emitting the red light beam and the green light beam and the second illumination device for emitting the blue light beam.

14. In the projector of the above aspect of the invention, it is preferable that a colored light beam combining element adapted to combine the blue light beam emitted from the second illumination device and the red light beam and the green light beam emitted from the rotating fluorescent plate with each other.

By adopting such a configuration, it becomes possible to standardize the optical system of the illumination device and the optical system of the second illumination device to some extent to thereby better simplify the configuration of the projector.

15. In the projector of the above aspect of the invention, it is preferable that the second illumination device includes a second light source device adapted to emit the blue light beam, and a scattering plate adapted to scatter the light beam emitted from the second light source device at a predetermined scattering intensity.

By adopting such a configuration as described above, it becomes possible to uniform the light distributions of the red light and the green light emitted from the illumination device and the light distribution of the blue light emitted from the second illumination device with each other to thereby project a more high-quality projection image.

BRIEF DESCRIPTION OF THE DRAWINGS

The invention will now be described with reference to the accompanying drawings, wherein like numbers reference like elements.

FIGS. 2A and 2B are graphs showing the emission characteristics of a light source device and a fluorescent layer in the first embodiment.

FIGS. 3A and 3B are diagrams for explaining a rotating fluorescent plate in the first embodiment.

DESCRIPTION OF EXEMPLARY EMBODIMENTS

Hereinafter, illumination devices and projectors according to the invention will be explained based on some embodiments illustrated in the accompanying drawings.

First Embodiment

Figure 1:
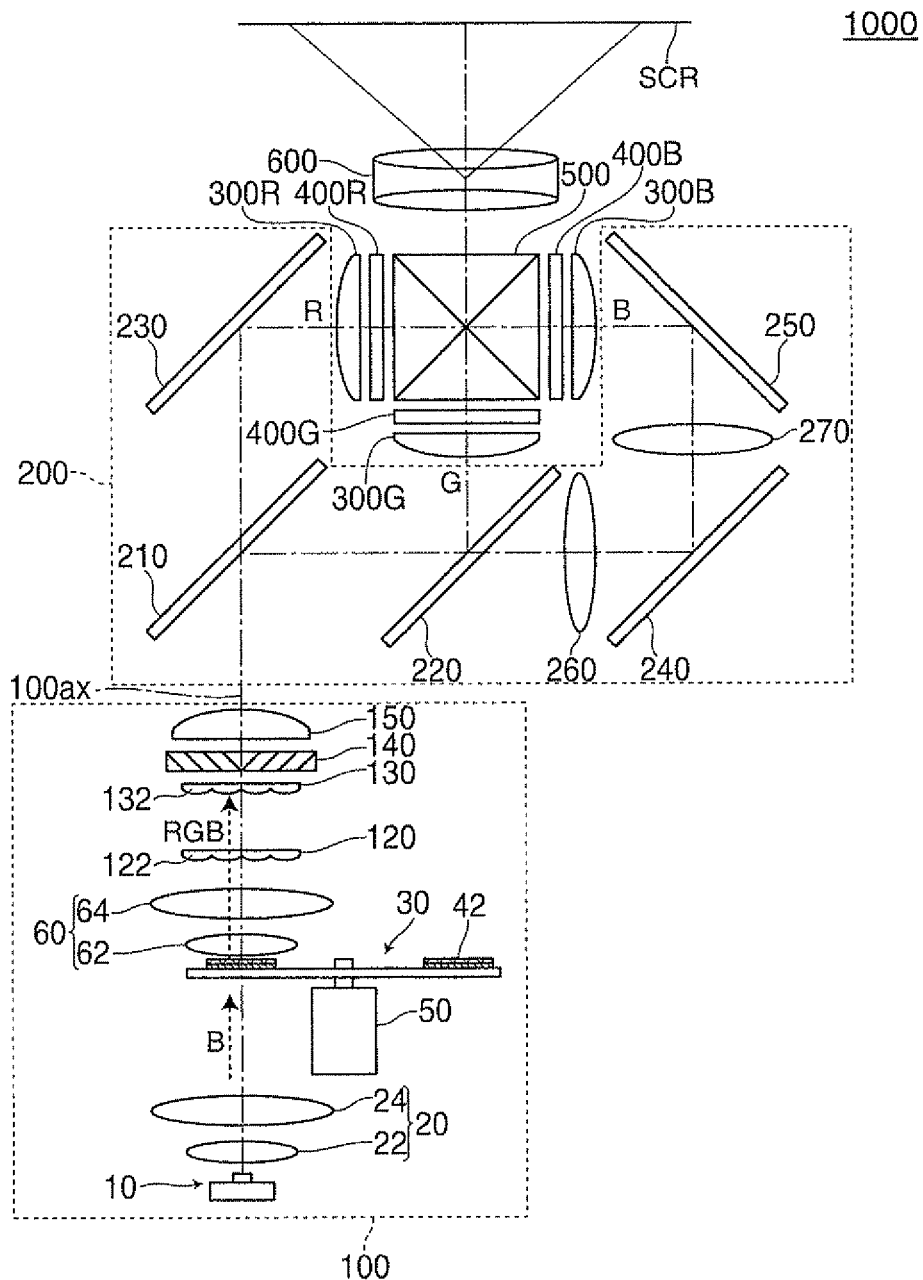
FIG. 1 is a top view showing an optical system of a projector according to a first embodiment of the invention.

FIG. 1 is a top view showing an optical system of a projector 1000 according to a first embodiment of the invention. It should be noted that in FIG. 1, in order for making the explanation easy, the constituents of the rotating fluorescent plate 30 are illustrated with the thickness thereof exaggerated. The same can be applied to the drawings mentioned later.

FIGS. 2A and 2B are graphs showing the emission characteristics of a light source device 10 and a fluorescent layer 42 in the first embodiment. FIG. 2A is a graph showing the emission characteristics of the light source device 10, and FIG. 2B is a graph showing the emission characteristics of the fluorescent layer 42. The emission characteristics denotes the characteristics of the light source device regarding the wavelength and the intensity of the light emitted therefrom in response to application of the voltage, or the characteristics of the fluorescent material regarding the wavelength and the intensity of the light emitted therefrom in response to input of the excitation light. The vertical axes of the graphs represent the relative emission intensity assuming that the emission intensity at the wavelength at which the emission intensity is the highest is 1. The lateral axes of the graphs represent the wavelength.

FIGS. 3A and 3B are diagrams for explaining the rotating fluorescent plate 30 in the first embodiment. FIG. 3A is a front view of the rotating fluorescent plate 30, and FIG. 3B is a cross-sectional view along the line A1-A1 shown in FIG. 3A.

Firstly, the configuration of the illumination device 100 and the projector 1000 according to the first embodiment will be explained.

As shown in FIG. 1, the projector 1000 according to the first embodiment is provided with the illumination device 100, a color separation light guide optical system 200, three liquid crystal light modulation devices 400R, 400G, and 400B as a light modulation device, a cross dichroic prism 500, and the projection optical system 600.

The illumination device 100 is provided with a solid-state light source device 10, a light collection optical system 20, the rotating fluorescent plate 30, an electric motor 50, a collimating optical system 60, a first lens array 120, a second lens array 130, a polarization conversion element 140, and an overlapping lens 150.

The light source device 10 is composed of a laser source for emitting a blue light beam (having a peak emission intensity at a wavelength of 445 nm, see FIG. 2A), which is a laser beam, as the excitation light beam. What is denoted with the symbol B in FIG. 2A is a colored light component emitted by the light source device 10 as the excitation light beam (the blue light beam). It should be noted that the light source device can be composed of a single laser source or a plurality of laser sources. Further, it is also possible to adopt a light source for emitting a blue light beam having a wavelength (e.g., 460 nm) other than 445 nm.

The light collection optical system 20 is provided with a first lens 22 and a second lens 24. The light collection optical system 20 is disposed in the light path from the light source device 10 to the rotating fluorescent plate 30, and collectively makes the blue light beam enter the fluorescent layer 42 (described later) in a roughly collected focused state. The first lens 22 and the second lens 24 are each formed of a convex lens.

The rotating fluorescent plate 30 is of a so-called transmissive type, and is obtained by continuously forming a single fluorescent layer 42 on a part of a circular disk 40 along the circumferential direction of the circular disk 40 as shown in FIGS. 1, 3A, and 3B. The circular disk 40 can be rotated by the electric motor 50. The area where the fluorescent layer 42 is formed includes an area where the blue light beam enters. The rotating fluorescent plate 30 is configured so as to emit the red light beam and the green light beam toward the side opposite to the side to which the blue light beam is input.

The rotating fluorescent plate 30 rotates 7,500 rpm in use. Although the detailed explanation will be omitted, the rotating fluorescent plate 30 has a diameter of 50 mm, and is configured so that the light axis of the blue light beam entering the rotating fluorescent plate 30 is located at the position approximately 22.5 mm distant from the rotational center of the rotating fluorescent plate 30. In other words, the rotating fluorescent plate 30 rotates at a rotational speed at which the focused spot of the blue light beam moves on the fluorescent layer 42 at 18 m/sec.

The circular disk 40 is made of a material transmitting the blue light beam. As the material of the circular disk 40, there can be used quartz glass, quartz crystal, sapphire, optical glass, transparent resin, and so on.

It is arranged that the blue light beam emitted from the light source device 10 enters the rotating fluorescent plate 30 from the side of the circular disk 40.

The fluorescent layer 42 is formed on the circular disk 40 via a dichroic film 44 that transmits the blue light beam and reflecting the red light beam and the green light beam. The dichroic film 44 is formed of, for example, a dielectric multilayer film.

The fluorescent layer 42 converts a part of the blue light beam emitted from the light source device 10 into the fluorescent light beam that includes the red light and the green light, and at the same time transmits a part of a remaining part of the blue light beam without performing the conversion. Specifically, the fluorescent layer 42 is efficiently excited by the blue light beam having a wavelength of about 445 nm, and converts the part of the blue light beam emitted by the light source device 10 into yellow light (fluorescent light) that includes the red light and the green light, and then emits the yellow light as shown in FIG. 2B. What is denoted with the symbol R in FIG. 2B is a colored light component available as the red light out of the light emitted by the fluorescent layer 42. Further, what is denoted with the symbol G is a colored light component available as the green light out of the light emitted by the fluorescent layer 42. The fluorescent layer 42 is formed of a layer including, for example, $(Y, Gd)_3(Al, Ga)_5O_{12}$:Ce as a YAG fluorescent material.

It should be noted that as the fluorescent layer a layer including another fluorescent material for emitting fluorescent including the red light and the green light can also be used. Further, as the fluorescent layer, a layer including a mixture of a fluorescent material for converting the excitation light into the red light and a fluorescent material for converting the excitation light into the green light can also be used.

As shown in FIG. 1, the collimating optical system 60 is provided with a first lens 62 for preventing the light beam emitted from the rotating fluorescent plate 30 from spreading, and a second lens 64 for roughly collimating the light beam emitted from the first lens 62, and collectively has a function of roughly collimating the light beam emitted from the rotating fluorescent plate 30. The first lens 62 and the second lens 64 are each formed of a convex lens.

The first lens array 120 has a plurality of first small lenses 122 for dividing the light beam emitted from the collimating optical system 60 into a plurality of partial light beams. The first lens array 120 has a function of a beam splitting optical element for splitting the light beam emitted from the collimating optical system 60 into a plurality of partial light beams, and has a configuration of arranging the plurality of first small lenses 122 in a plane perpendicular to the illumination light axis 100ax in a matrix with a plurality of rows and a plurality of columns. Although the explanation with reference to a drawing will be omitted, an outer shape of the first small lens 122 is substantially similar to an outer shape of the image forming areas of the liquid crystal light modulation devices 400R, 400G, and 400B.

The second lens array 130 has a plurality of second small lenses 132 corresponding to the plurality of first small lenses 122 of the first lens array 120. The second lens array 130 has a function of forming the image of each of the first small lenses 122 of the first lens array 120 in the vicinity of the image forming areas of the liquid crystal light modulation devices 400R, 400G, and 400B in cooperation with the overlapping lens 150. The second lens array 130 has a configuration of arranging the plurality of second small lenses 132 in a plane perpendicular to the illumination light axis 100ax in a matrix with a plurality of rows and a plurality of columns.

The polarization conversion element 140 is a polarization conversion element for converting each of the partial beams split into by the first lens array 120 into a substantially unique linearly polarized light beam having a uniform polarization direction, and emitting the resulted partial light beams.

The polarization conversion element 140 has a polarization split layer for transmitting one linearly polarized component out of the polarization components included in the light from the rotating fluorescent plate 30 without modification while reflecting the other linearly polarized component in a direction perpendicular to the illumination light axis 100ax, a reflecting layer for reflecting the other linearly polarized component, which is reflected by the polarization split layer, in a direction parallel to the illumination light axis 100ax, and a wave plate for converting the other linearly polarized component reflected by the reflecting plate into the one linearly polarized component.

The overlapping lens 150 is an optical element for collecting each of the partial light beams from the polarization conversion element 140 to thereby overlap the partial light beams in the vicinity of the image forming areas of the liquid crystal light modulation devices 400R, 400G, and 400B.

The overlapping lens 150 is disposed so that the optical axis of the overlapping lens 150 and the light axis of the illumination device 100 become substantially identical to each other. It should be noted that the overlapping lens 150 can be configured with a compound lens having a plurality of lenses combined with each other. The first lens array 120, the second lens array 130, and the overlapping lens 150 constitute an integrator optical system for homogenizing the in-plane light intensity distribution of the light from the rotating fluorescent plate 30.

It should be noted that a rod integrator optical system provided with an integrator rod can also be used instead of the lens integrator optical system.

The color separation light guide optical system 200 includes dichroic mirrors 210, 220, reflecting mirrors 230, 240, 250, and relay lens 260, 270. The color separation light guide optical system 200 has a function of separating the light beam from the illumination device 100 into the red light beam, the green light beam, and the blue light beam, and respectively guiding the colored light beams of the red light beam, the green light beam, and the blue light beam to the liquid crystal light modulation devices 400R, 400G, 400B to be the objects of illumination.

Collecting lenses 300R, 300G, and 300B are disposed between the color separation light guide optical system 200 and the liquid crystal light modulation devices 400R, 400G, and 400B, respectively.

The dichroic mirrors 210, 220 are mirrors each having a wavelength selecting transmissive film formed on a substrate, which reflects a light beam in a predetermined wavelength band and transmits a light beam in another wavelength band.

The dichroic mirror 210 is a dichroic mirror for transmitting the red light component and reflecting the green light component and the blue light component.

The dichroic mirror 220 is a dichroic mirror for reflecting the green light component and transmitting the blue light component.

The reflecting mirror 230 is a reflecting mirror for reflecting the red light component.

The reflecting mirrors 240, 250 are reflecting mirrors for reflecting the blue light component.

The red light beam transmitted through the dichroic mirror 210 is reflected by the reflecting mirror 230, and then enters the image forming area of the liquid crystal light modulation device 400R for the red light beam after being transmitted through the collecting lens 300R.

The green light beam reflected by the dichroic mirror 210 is further reflected by the dichroic mirror 220, and then enters the image forming area of the liquid crystal light modulation device 400G for the green light beam after being transmitted through the collecting lens 300G.

The blue light beam having passed through the dichroic mirror 220 enters the image forming area of the liquid crystal light modulation device 400B for the blue light beam via the relay lens 260, the reflecting mirror 240 on the entrance side, the relay lens 270, the reflecting mirror 250 on the exit side, and the collecting lens 300B. The relay lenses 260, 270 and the reflecting mirrors 240, 250 have a function of guiding the blue light component thus transmitted through the dichroic mirror 220 to the liquid crystal light modulation device 400B.

It should be noted that since the length of the light path of the blue light beam is larger than the lengths of the light paths of the other colored light beams, such relay lenses 260, 270 are provided to the light path of the blue light beam in order for preventing degradation of the light efficiency caused by the diffusion of the light beam. In the projector 1000 according to the first embodiment, such a configuration as described above is adopted because the length of the light path of the blue light beam is large. However, it is also possible to adopt the configuration in which the length of the light path of the red light beam is elongated, and the relay lenses 260, 270 and the reflecting mirrors 240, 250 are used in the light path of the red light beam.

The liquid crystal light modulation devices 400R, 400G, and 400B are for modulating the respective colored light beams having entered in accordance with the image information to thereby form a color image, and become the illumination object of the illumination device 100. It should be noted that, although omitted from the drawings, the entrance side polarization plates are disposed between the collecting lenses 300R, 300G, 300B and the liquid crystal light modulation devices 400R, 400G, 400B, respectively, so as to intervene therebetween, and the exit side polarization plates are disposed between the liquid crystal light modulation devices 400R, 400G, 400B and the cross dichroic prism 500, respectively, so as to intervene therebetween. The light modulation of the respective colored light beam having entered is performed by the entrance side polarization plates, the liquid crystal light modulation devices 400R, 400G, and 400B, and the exit side polarization plates described above.

The liquid crystal light modulation devices 400R, 400G, and 400B are each a transmissive liquid crystal light modulation device formed by encapsulating a liquid crystal material as an electro-optic material between a pair of transparent glass plates, and modulates the polarization direction of one kind of linearly polarized light beam emitted from the entrance side polarization plate in accordance with an image signal provided thereto using, for example, polysilicon TFTs as switching elements.

The cross dichroic prism 500 is an optical element for combining optical images modulated for respective colored light beams emitted from the respective exit side polarization plates to form a color image. The cross dichroic prism 500 has a substantially rectangular planar shape formed of four rectangular prisms bonded with each other, and on the substantially X-shaped interfaces on which the rectangular prisms are bonded with each other, there are formed dielectric multilayer films. The dielectric multilayer film formed on one of the substantially X-shaped interfaces is for reflecting the red light beam, and the dielectric multilayer film formed on the other of the interfaces is for reflecting the blue light beam. The red light beam and the blue light beam are deflected by these dielectric multilayer films to have the proceeding direction aligned with the proceeding direction of the green light, thus the three colored light beams are combined.

The color image emitted from the cross dichroic prism 500 is projected in an enlarged manner by the projection optical system 600 to form an image on the screen SCR.

Then, advantages of the illumination device 100 and the projector 1000 according to the first embodiment will be explained.

As described above, according to the illumination device 100 related to the first embodiment, since there are provided the light source device 10 for emitting the excitation light (the blue light) and the rotating fluorescent plate 30 provided with the fluorescent layer 42 for converting a part or the whole of the excitation light into the fluorescent light that includes two or more colored light beams (the red light beam and the green light beam), it becomes possible to obtain the a plurality of colored light beams using the light source 10 for emitting the excitation light.

Further, according to the illumination device 100 related to the first embodiment, since the rotating fluorescent plate 30 provided with a single fluorescent layer 42 is used, it becomes possible to make the manufacturing process of the rotating fluorescent plate 30 relatively easy.

Further, according to the illumination device 100 related to the first embodiment, since there is used the rotating fluorescent plate having the single fluorescent layer 42 formed continuously along the circumferential direction of the circular disk 40, it results in that the same colored light beam is always emitted from the illumination device 100, and as a result, it becomes possible for the illumination device 100 to be applied to the liquid crystal projector of the non-colorsequential type having no color breakup phenomenon and strong characteristics.

Further, according to the illumination device 100 related to the first embodiment, since there is provided the rotating fluorescent plate 30 obtained by providing the single fluorescent layer 42 to the rotatable circular disk 40, the heat generated in the fluorescent layer 42 due to the irradiation with the excitation light can be radiated in a large area along the circumferential direction, and as a result, it becomes possible to prevent the deterioration of the fluorescent layer 42 and degradation of the luminous efficiency due to overheat of the fluorescent layer 42.

Further, according to the illumination device 100 related to the first embodiment, since the light source device 10 emits the blue light as the excitation light, the fluorescent layer 42 converts a part of the blue light emitted from the light source device 10 into the fluorescent light beam that includes the red light and the green light, and at the same time, transmits a part of a remaining part of the blue light without conversion, it becomes possible to emit the white light from the illumination device using the light source device 10 for emitting the blue light.

Further, according to the illumination device 100 related to the first embodiment, since the circular disk 40 is made of the material transmitting the excitation light, the fluorescent layer 42 is formed on the circular disk 40 via the dichroic film 44 for transmitting the excitation light and reflecting the fluorescent light, and it is arranged that the excitation light enters the rotating fluorescent plate 30 from the side of the circular disk 40, it becomes possible to emit the illumination light from the illumination device using the so-called transmissive rotating fluorescent plate 30.

Further, according to the illumination device 100 related to the first embodiment, since the light collection optical system 20 is provided, it becomes possible to emit the fluorescent light in a small area, and as a result, it becomes possible to improve the light efficiently.

Further, according to the illumination device 100 related to the first embodiment, since the rotating fluorescent plate 30 rotates at the rotational speed at which the focused spot of the excitation light moves on the fluorescent layer 42 at approximately 18 m/sec, it becomes possible to reduce the temperature rise generated in the fluorescent layer 42 due to the irradiation with the excitation light to an extremely low level, and as a result, it becomes possible to better prevent the deterioration of the fluorescent layer 42 and the degradation of the luminous efficiency due to the overheat of the fluorescent layer 42.

Further, according to the illumination device 100 related to the first embodiment, since the light source device 10 is formed of the laser source, it becomes possible to project the projection image immediately after the power is on.

Further, according to the illumination device 100 related to the first embodiment, since the laser source with high light collecting power is used as the light source, it becomes possible to emit the fluorescent light in a smaller area, and as a result, it becomes possible to better improve the light efficiently.

According to the projector 1000 related to the first embodiment, since the illumination device 100 is provided, there can be obtained the projector capable of obtaining a plurality of colored light beams using the light source device 10 for emitting the excitation light, capable of making the manufacturing process of the rotating fluorescent plate 30 relatively simple, and being realized as a liquid crystal projector.

Further, according to the projector 1000 related to the first embodiment, since the light source device 10 emits the blue light as the excitation light, the fluorescent layer 42 converts a part of the blue light emitted from the light source device 10 into the fluorescent light beam that includes the red light and the green light, and at the same time, transmits a part of a remaining part of the blue light without conversion, it becomes possible to project a full-color image using the light source device 10 for emitting the blue light.

Second Embodiment

Figure 4:
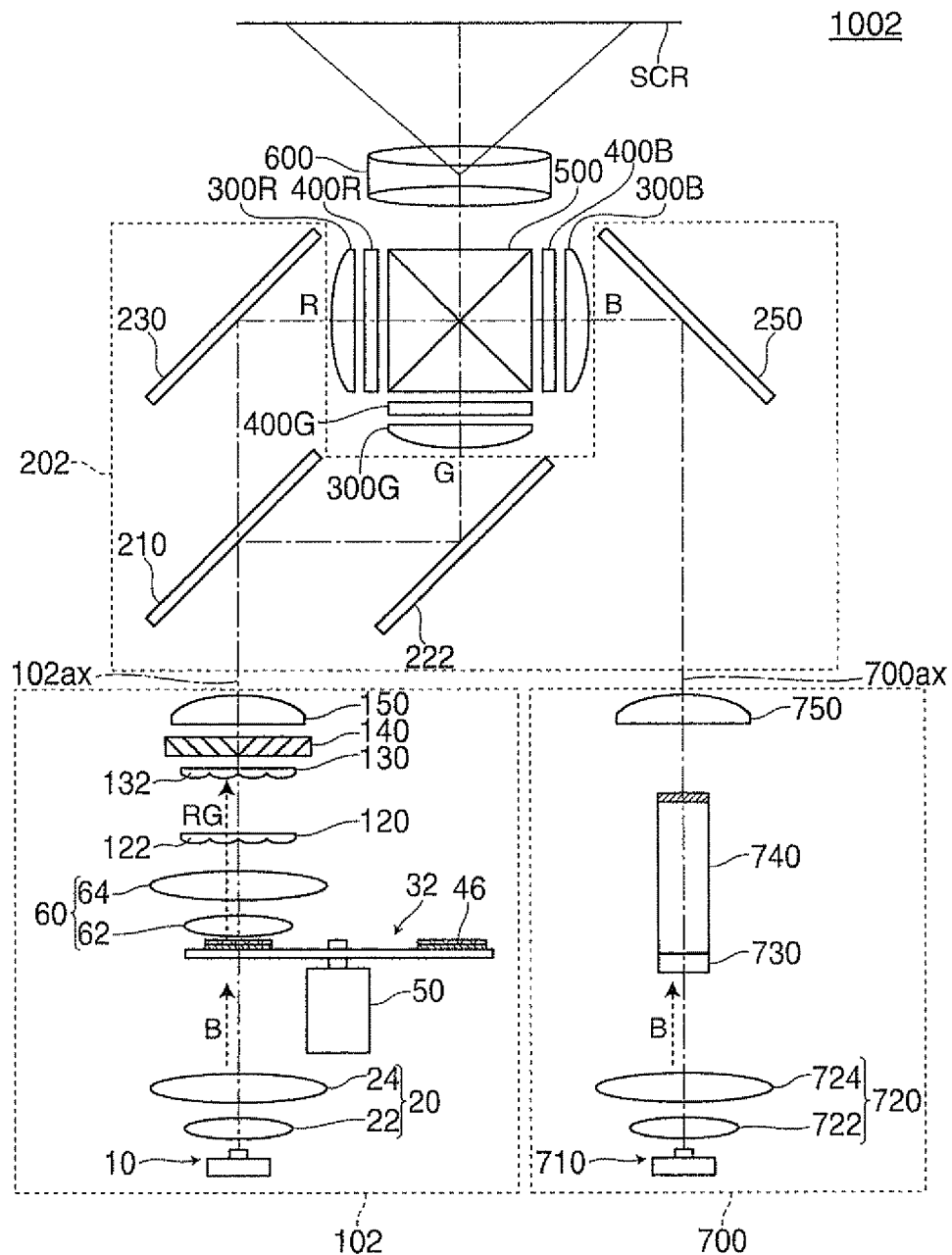
FIG. 4 is a top view showing an optical system of a projector according to a second embodiment of the invention.

FIG. 4 is a top view showing an optical system of a projector 1002 according to a second embodiment of the invention.

Figure 5:
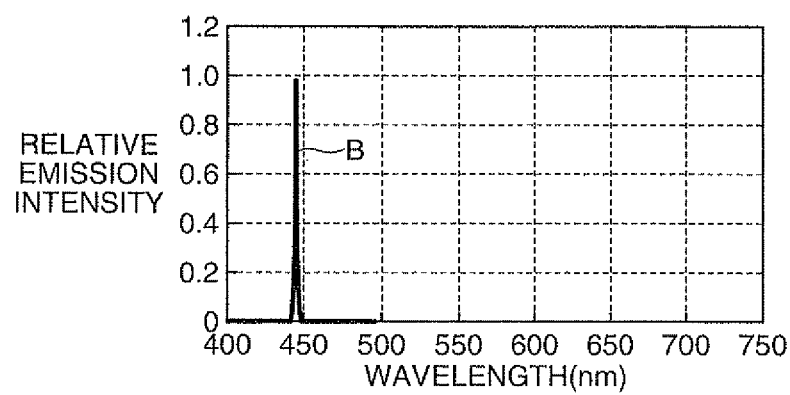
FIG. 5 is a graph showing the emission characteristics of a second light source device in the second embodiment.

FIG. 5 is a graph showing the emission characteristics of a second light source device 710 in the second embodiment. It should be noted that since the emission characteristics of the light source device 10 and the fluorescent layer 46 in the second embodiment are substantially the same as the emission characteristics of the light source device 10 and the fluorescent layer 42 in the first embodiment, the graphical representation will be omitted.

The projector 1002 according to the second embodiment basically has substantially the same configuration as the configuration of the projector 1000 according to the first embodiment, but is different from the projector 1000 according to the first embodiment in the configuration of the illumination device 102, and in the point that a second illumination device is further provided. Specifically, in the projector 1002 according to the second embodiment, as shown in FIG. 4, the illumination device 102 emits the light including the red light and the green light as the illumination light, and the projector 1002 is further provided with the second illumination device 700 for emitting the blue light. Further, in accordance therewith, the structure of the color separation light guide optical system is also made different.

Although the illumination device 102 basically has substantially the same configuration as that of the illumination device 100 according to the first embodiment, the configuration of the rotating fluorescent plate is different from that of the illumination device 100 according to the first embodiment. Specifically, in the illumination device 102 according to the second embodiment, the fluorescent layer 46 in the rotating fluorescent plate 32 converts the blue light emitted from the light source device 10 into the fluorescent light beam that includes the red light and the green light. More specifically, the fluorescent layer 46 is thicker than the fluorescent layer 42 in the first embodiment, and the blue light having entered the fluorescent layer 46 is converted into the fluorescent light beam that includes the red light and the green light without passing through the fluorescent layer 46.

The second illumination device 700 is provided with a second light source device 710, a light collection optical system 720, a scattering plate 730, a polarization conversion integrator rod 740, and a collecting lens 750.

The second light source device 710 is a laser source for emitting a blue light beam (having a peak emission intensity at a wavelength of 445 nm, see FIG. 5), which is a laser beam, as a colored light beam. What is denoted with the symbol B in FIG. 5 is a colored light component emitted by the second light source device 710 as the excitation light beam (the blue light beam).

As shown in FIG. 4, the light collection optical system 720 is provided with a first lens 722 and a second lens 724. The light collection optical system 720 collectively makes the blue light beam enter the scattering plate 730 in a roughly focused state. The first lens 722 and the second lens 724 are each formed of a convex lens.

The scattering plate 730 scatters the blue light beam emitted from the second light source device 710 at a predetermined scattering intensity to thereby obtain the blue light beam having the light distribution similar to that of the fluorescent light (the red light and the green light emitted from the rotating fluorescent plate 32).

As the scattering plate 730, obscured glass made of optical glass, for example, can be used.

The polarization conversion integrator rod 740 homogenizes the in-plane light intensity distribution of the blue light from the second light source device 710, and converts the polarization direction of the blue light beam into substantially one kind of linearly polarized light with the polarization directions aligned. Although the detailed explanation is omitted, the polarization conversion integrator rod has an integrator rod, a reflecting plate disposed on the entrance surface side of the integrator rod and provided with a small hole through which the blue light beam enters, and a reflective polarization plate disposed on the side of the exit surface.

It should be noted that a lens integrator optical system together with a polarization conversion element can also be used instead of the polarization conversion integrator rod.

The collecting lens 750 collects the light from the polarization conversion integrator rod 740, and then makes the light enter the vicinity of the image forming area of the liquid crystal light modulation device 400B.

The color separation light guide optical system 202 is provided with a dichroic mirror 210, reflecting mirrors 222, 230, and 250. The color separation light guide optical system 202 has a function of separating the light beam from the illumination device 102 into the red light beam and the green light beam, and respectively guiding the colored light beams of the red light beam and the green light beam from the illumination device 102 and the blue light beam from the second illumination device 700 to the liquid crystal light modulation devices 400R, 400G, 400B to be the illumination objects.

The red light beam transmitted through the dichroic mirror 210 is reflected by the reflecting mirror 230, and then enters the image forming area of the liquid crystal light modulation device 400R for the red light beam after being transmitted through the collecting lens 300R.

The green light beam reflected by the dichroic mirror 210 is further reflected by the reflecting mirror 222, and then enters the image forming area of the liquid crystal light modulation device 400G for the green light beam after passing through the collecting lens 300G.

The blue light beam from the second light source device 700 is reflected by the reflecting mirror 250, and then enters the image forming area of the liquid crystal light modulation device 400B for the blue light beam after passing through the collecting lens 300B.

As described above, although different from the illumination device 100 according to the first embodiment in the configuration of the rotating fluorescent plate, since the illumination device 102 according to the second embodiment is provided with the light source device 10 for emitting the excitation light (the blue light) and the rotating fluorescent plate 32 provided with the fluorescent layer 46 for converting a part or the whole of the excitation light into the fluorescent light that includes two or more colored light beams (the red light beam and the green light beam), it becomes possible to obtain a plurality of colored light beams using the light source 10 for emitting the excitation light similar to the illumination device 100 according to the first embodiment.

Further, according to the illumination device 102 related to the second embodiment, since the rotating fluorescent plate 32 provided with the single fluorescent layer 46 is used, it becomes possible to make the manufacturing process of the rotating fluorescent plate 32 relatively easy similarly to the illumination device 100 according to the first embodiment.

Further, according to the illumination device 102 related to the second embodiment, since there is used the rotating fluorescent plate having the single fluorescent layer 42 formed continuously along the circumferential direction of the circular disk 40, it results in that the same colored light beam is always emitted from the illumination device 102, and as a result, it becomes possible for the illumination device 102 to be applied to the liquid crystal projector of the non-colorsequential type having no color breakup phenomenon and strong characteristics similarly to the illumination device 100 according to the first embodiment.

Further, according to the illumination device 102 related to the second embodiment, since there is provided the rotating fluorescent plate 32 obtained by providing the single fluorescent layer 46 to the rotatable circular disk 40, the heat generated in the fluorescent layer 46 due to the irradiation with the excitation light can be radiated in a large area along the circumferential direction, and as a result, it becomes possible to prevent the deterioration of the fluorescent layer 46 and the degradation of the luminous efficiency due to the overheat of the fluorescent layer 46 similarly to the illumination device 100 according to the first embodiment.

Further, according to the illumination device 102 related to the second embodiment, since the light source device 10 emits the blue light as the excitation light, the fluorescent layer 42 converts a part of the blue light emitted from the light source device 10 into the light including the red light and the green light, it becomes possible to emit the light including the red light and the green light from the illumination device using the light source device for emitting the blue light.

It should be noted that the illumination device 102 according to the second embodiment has substantially the same configuration as that of the illumination device 100 according to the first embodiment in other points than the configuration of the rotating fluorescent plate, and therefore, obtains the corresponding advantages out of the advantages that the illumination device 100 according to the first embodiment has.

Although different from the case of the projector 1000 according to the first embodiment in the configuration of the illumination device 102 and in the point that the second illumination device is further provided, according to the projector 1002 related to the second embodiment, since the illumination device 102 configured as described above is provided, there can be obtained the projector capable of obtaining a plurality of colored light beams using the light source device 10 for emitting the excitation light, capable of making the manufacturing process of the rotating fluorescent plate 32 relatively simple, and being realized as a liquid crystal projector similarly to the case of the projector 1000 according to the first embodiment.

Further, according to the projector 1002 related to the second embodiment, since the light source device 10 emits the blue light, the fluorescent layer 46 converts the blue light emitted from the light source device 10 into the fluorescent light that includes the red light and the green light and then emits the fluorescent light, and the projector 1002 is provided with the second illumination device 700 for emitting the blue light, it becomes possible to project a full-color image using the light source device 10 and the second illumination device 700 for emitting the blue light.

Further, according to the projector 1002 related to the second embodiment, since the second illumination device 700 is provided with the second light source device 710 for emitting the blue light and the scattering plate 730 for scattering the light from the second light source device 710, it becomes possible to uniform the light distributions of the red light and the green light emitted from the illumination device 102 and the light distribution of the blue light emitted from the second illumination device with each other to thereby project a more high-quality projection image.

Third Embodiment

Figure 6:
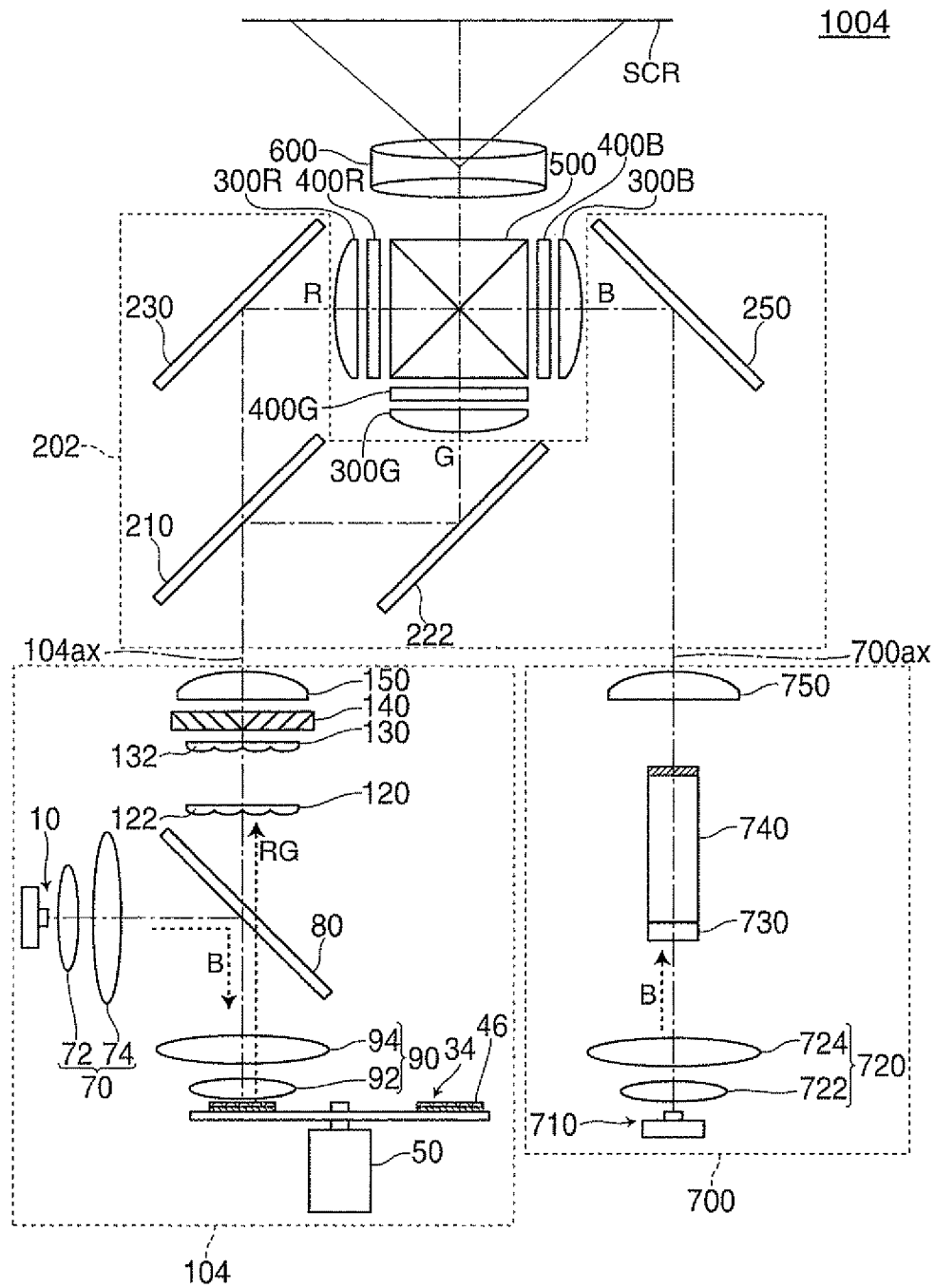
FIG. 6 is a top view showing an optical system of a projector according to a third embodiment of the invention.

FIG. 6 is a top view showing an optical system of a projector 1004 according to a third embodiment of the invention.

Figure 7A:
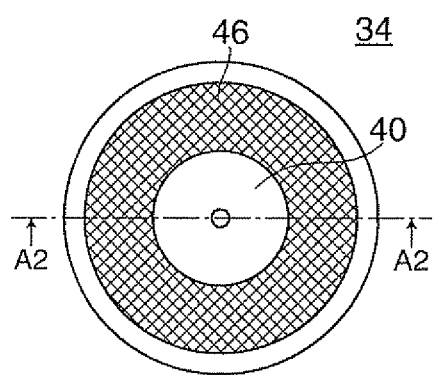
FIGS. 7A and 7B are diagrams for explaining a rotating fluorescent plate in the third embodiment.
Figure 7B:
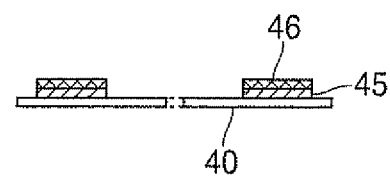

FIGS. 7A and 7B are diagrams for explaining the rotating fluorescent plate 34 in the third embodiment. FIG. 7A is a front view of the rotating fluorescent plate 34, and FIG. 7B is a cross-sectional view along the line A2-A2 shown in FIG. 7A.

The illumination device 104 according to the third embodiment basically has a configuration similar to the illumination device 102 according to the second embodiment, but is different from the illumination device 102 according to the second embodiment in the configuration of the rotating fluorescent plate.

Specifically, in the rotating fluorescent plate 34 in the third embodiment, as shown in FIGS. 7A and 7B, the fluorescent layer 46 is formed on the circular disk 40 via a reflecting film 45 for reflecting visible light (a so-called reflective rotating fluorescent plate), and is configured so as to emit the fluorescent light toward the side which the blue light enters from as described later. Further, in accordance wherewith, as shown in FIG. 6, the illumination device 104 according to the third embodiment is different in the optical position of the light source device 10, further provided with a collimating optical system 70, a dichroic mirror 80, and a collimating light collection optical system 90, and configured so that the blue light from the light source device 10 enters the rotating fluorescent plate 34 from the side of the fluorescent layer 46.

It should be noted that in the case in which the so-called reflective rotating fluorescent plate is used as described above, there is no need for using the circular disk made of a material transmitting the excitation light, but a circular disk made of an opaque material such as metal can also be used.

The light source device 10 is disposed so as to have an optical axis perpendicular to an illumination light axis 104ax.

The collimating optical system 70 is provided with a first lens 72 for preventing the light beam emitted from the light source device 10 from spreading, and a second lens 74 for roughly collimating the light beam from the first lens 72, and collectively has a function of roughly collimating the light from the light source device 10. The first lens 72 and the second lens 74 are each formed of a convex lens.

The dichroic mirror 80 is disposed in the light path from the collimating optical system 70 to the rotating fluorescent plate 34 (the collimating light collection optical system 90) so as to intersect each of the optical axis of the light source device 10 and the illumination light axis 104ax at an angle of 45°. The dichroic mirror 80 reflects the blue light, and transmits the red light and the green light.

The collimating light collection optical system 90 has a function of making the blue light from the dichroic mirror 80 enter the fluorescent layer 46 in a roughly focused state, and a function of roughly collimating the fluorescent light emitted from the rotating fluorescent plate. The collimating light collection optical system 90 is provided with a first lens 92 and a second lens 94. The first lens 92 and the second lens 94 are each formed of a convex lens.

As described above, although different from the illumination device 102 according to the second embodiment in the configuration of the rotating fluorescent plate, since the illumination device 104 according to the third embodiment is provided with the light source device 10 for emitting the excitation light (the blue light) and the rotating fluorescent plate 34 provided with the fluorescent layer 46 for converting a part or the whole of the excitation light into the fluorescent light including two or more colored light beams (the red light beam and the green light beam), it becomes possible to obtain a plurality of colored light beams using the light source 10 for emitting the excitation light similar to the illumination device 102 according to the second embodiment.

Further, according to the illumination device 104 related to the third embodiment, since the rotating fluorescent plate 34 provided with the single fluorescent layer 46 is used, it becomes possible to make the manufacturing process of the rotating fluorescent plate 34 relatively easy similarly to the illumination device 102 according to the second embodiment.

Further, according to the illumination device 104 related to the third embodiment, since there is used the rotating fluorescent plate having the single fluorescent layer 46 formed continuously along the circumferential direction of the circular disk 40, it results in that the same colored light beam is always emitted from the illumination device 104, and as a result, it becomes possible for the illumination device 104 to be applied to the liquid crystal projector of the non-colorsequential type having no color breakup phenomenon and strong characteristics similarly to the illumination device 102 according to the second embodiment.

Further, according to the illumination device 104 related to the third embodiment, since there is provided the rotating fluorescent plate 34 obtained by providing the single fluorescent layer 46 to the rotatable circular disk 40, the heat generated in the fluorescent layer 46 due to the irradiation with the excitation light can be radiated in a large area along the circumferential direction, and as a result, it becomes possible to prevent the deterioration of the fluorescent layer 46 and the degradation of the luminous efficiency due to the overheat of the fluorescent layer 46 similarly to the illumination device 102 according to the second embodiment.

Further, according to the illumination device 104 related to the third embodiment, since the fluorescent layer 46 is formed on the circular disk 40 via the reflecting film 45 for reflecting visible light, and it is arranged that the excitation light enters the rotating fluorescent plate 34 from the side of the fluorescent layer 46, it becomes possible to emit the illumination light from the illumination device using the so-called reflective rotating fluorescent plate 34.

It should be noted that the illumination device 104 according to the third embodiment has substantially the same configuration as that of the illumination device 102 according to the second embodiment in other points than, for example, the configuration of the rotating fluorescent plate, and therefore, obtains the corresponding advantages out of the advantages that the illumination device 102 according to the second embodiment has.

Although different from the case of the projector 1002 according to the second embodiment in the configuration of the illumination device 104, according to the projector 1004 related to the third embodiment, since the illumination device 104 configured as described above is provided, there can be obtained the projector capable of obtaining a plurality of colored light beams using the light source device 10 for emitting the excitation light, capable of making the manufacturing process of the rotating fluorescent plate 34 relatively simple, and being realized as a liquid crystal projector similarly to the case of the projector 1002 according to the second embodiment.

It should be noted that the projector 1004 according to the third embodiment has substantially the same configuration as that of the projector 1002 according to the second embodiment in other points than the configuration of the illumination device, and therefore, obtains the corresponding advantages out of the advantages that the projector 1002 according to the second embodiment has.

Fourth Embodiment

Figure 8:
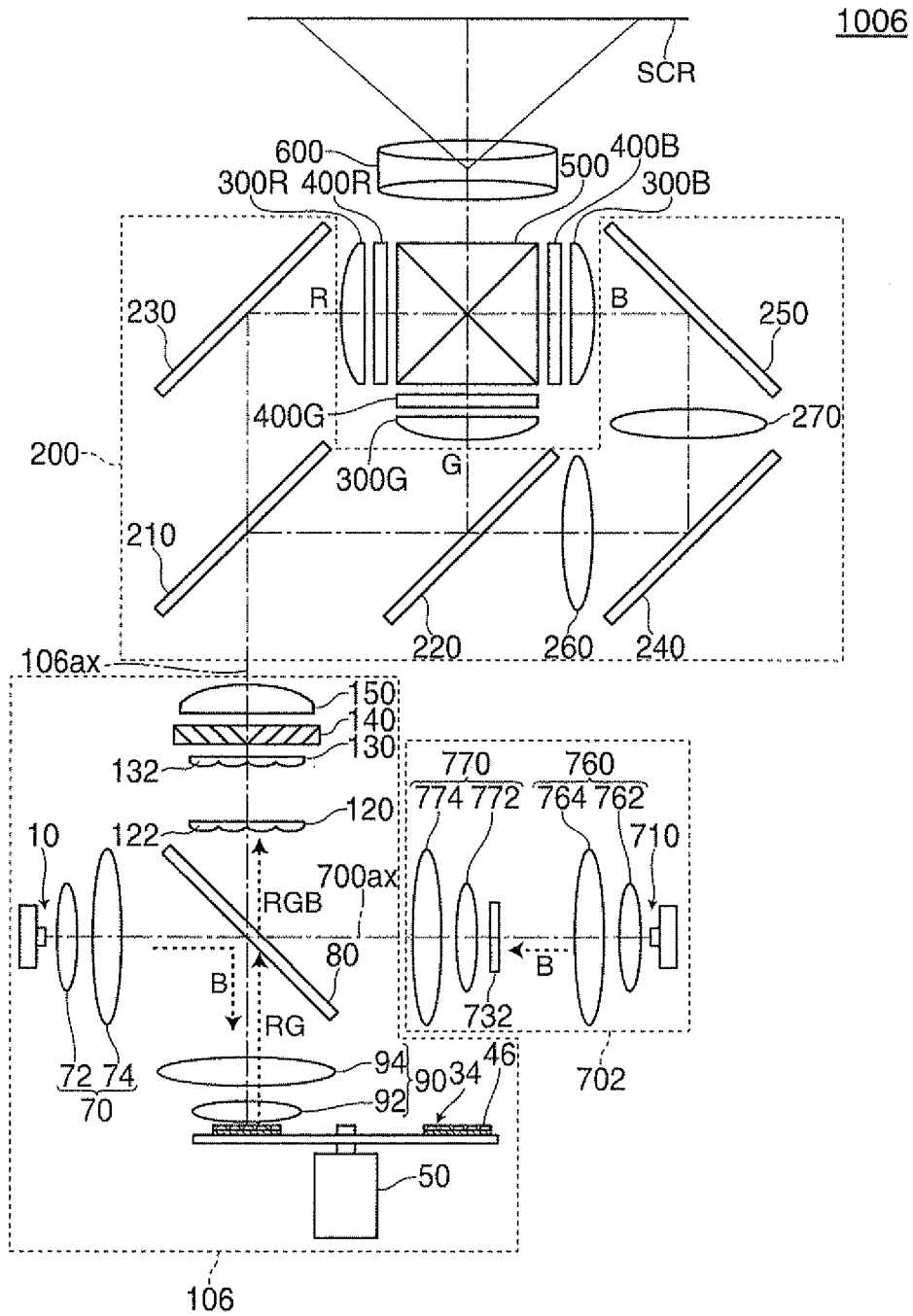
FIG. 8 is a top view showing an optical system of a projector according to a fourth embodiment of the invention.

FIG. 8 is a top view showing an optical system of a projector 1006 according to a fourth embodiment of the invention.

The projector 1006 according to the fourth embodiment basically has a configuration similar to the projector 1004 according to the third embodiment, but is different from the projector 1004 according to the third embodiment in the configuration of the second illumination device. Specifically, as shown in FIG. 8, in the projector 1006 according to the fourth embodiment, the second illumination device 702 emits the blue light beam toward the dichroic mirror 80 in an illumination device 106. In the fourth embodiment, the dichroic mirror 80 additionally has a function of the colored light combination element for merging the light emitted from the second illumination device 702 into the red light and the green light emitted from the rotating fluorescent plate 34. Further, in accordance therewith, the configuration of the color separation light guide optical system is also made different.

The second illumination device 702 is provided with a second light source device 710, a light collection optical system 760, a scattering plate 732, and a collimating optical system 770.

The light collection optical system 760 is provided with a first lens 762 and a second lens 764. The light collection optical system 760 focuses the blue light from the second light source device 710 in the vicinity of the scattering plate 732. The first lens 762 and the second lens 764 are each formed of a convex lens.

The scattering plate 732 scatters the blue light beam from the second light source device 710 at a predetermined scattering intensity to thereby obtain the blue light beam having the light distribution similar to that of the fluorescent light (the light emitted from the rotating fluorescent plate 34). As the scattering plate 732, obscured glass made of optical glass, for example, can be used.

The collimating optical system 770 is provided with a first lens 772 for preventing the light beam emitted from the second light source device 710 from spreading, and a second lens 774 for roughly collimating the light beam from the first lens 772, and collectively has a function of roughly collimating the light from the second light source device 710. The first lens 772 and the second lens 774 are each formed of a convex lens.

The color separation light guide optical system 200 in the fourth embodiment has substantially the same configuration as that of the color separation light guide optical system 200 in the first embodiment, and therefore, the explanation therefor will be omitted.

Although different from the case of the projector 1004 according to the third embodiment in, for example, the configuration of the second illumination device, according to the projector 1006 related to the fourth embodiment, since the illumination device 106 configured as described above is provided, there can be obtained the projector capable of obtaining a plurality of colored light beams using the light source device 10 for emitting the excitation light, capable of making the manufacturing process of the rotating fluorescent plate 34 relatively simple, and being realized as a liquid crystal projector similarly to the case of the projector 1004 according to the third embodiment.

Further, according to the projector 1006 related to the fourth embodiment, since the dichroic mirror 80 for merging the light emitted from the second illumination device 702 into the red light and the green light emitted from the rotating fluorescent plate 34 is provided, it becomes possible to standardize the optical system of the illumination device 106 and the optical system of the second illumination device 702 to some extent to thereby make the configuration of the projector simpler.

It should be noted that the projector 1006 according to the fourth embodiment has substantially the same configuration as that of the projector 1004 according to the third embodiment in other points than, for example, the configuration of the second illumination device, and therefore, obtains the corresponding advantages out of the advantages that the projector 1004 according to the third embodiment has.

It should be noted that the illumination device 106 according to the fourth embodiment has substantially the same configuration as that of the illumination device 104 according to the third embodiment, and therefore, obtains the advantages that the illumination device 104 according to the third embodiment has.

Fifth Embodiment

Figure 9:
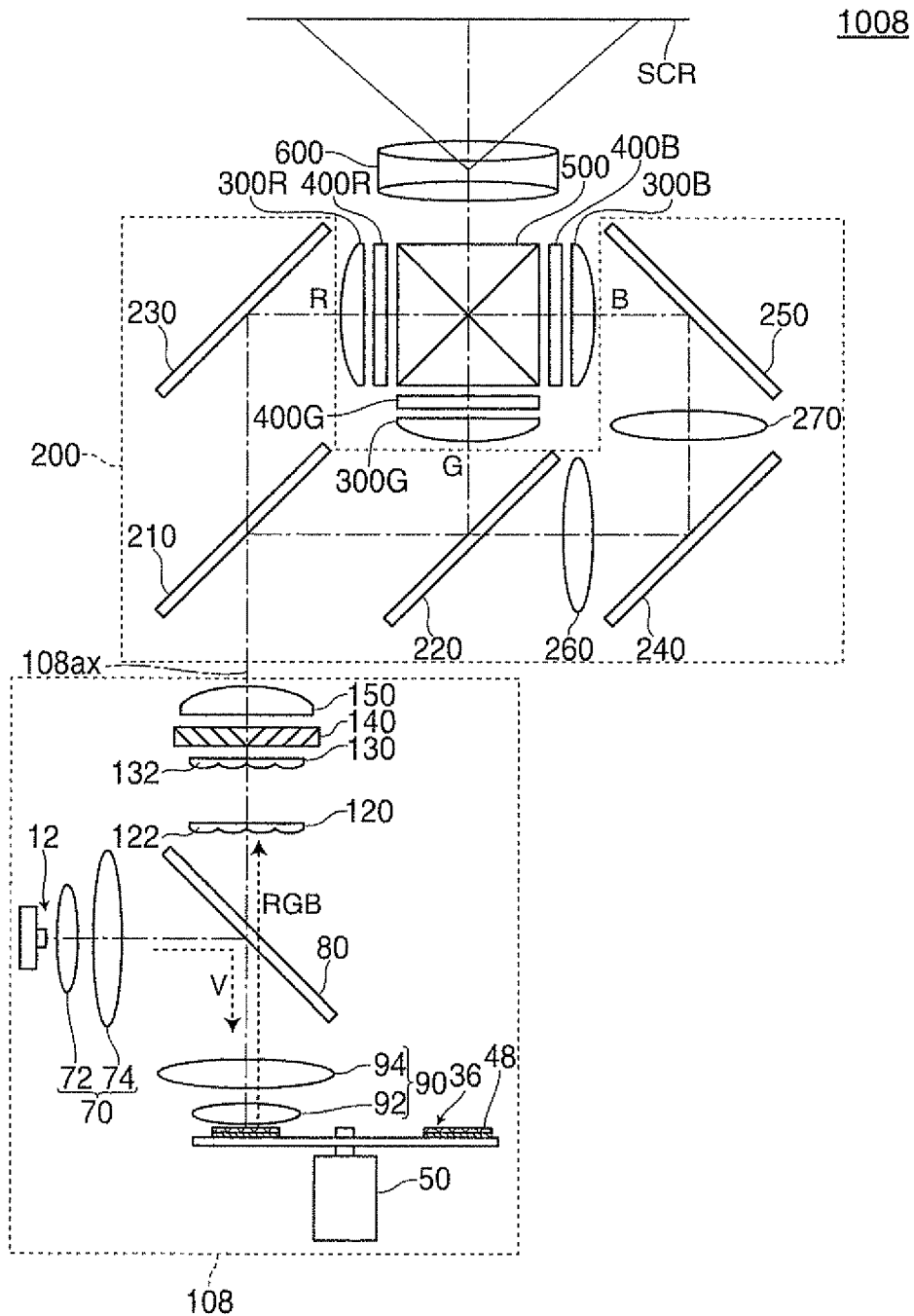
FIG. 9 is a top view showing an optical system of a projector according to a fifth embodiment of the invention.

FIG. 9 is a top view showing an optical system of a projector 1008 according to a fifth embodiment of the invention.

Figure 10A:
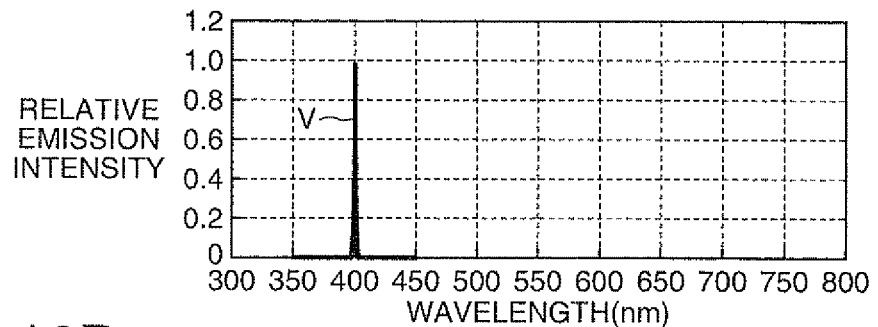
FIGS. 10A through 10D are graphs showing the emission characteristics of a light source device and a fluorescent layer in the fifth embodiment.
Figure 10B:
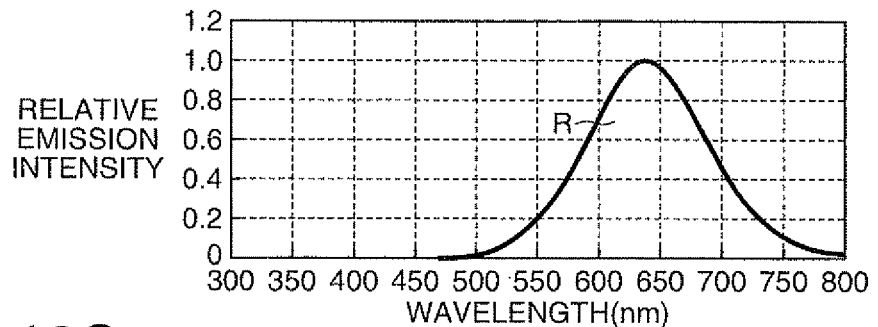
Figure 10C:
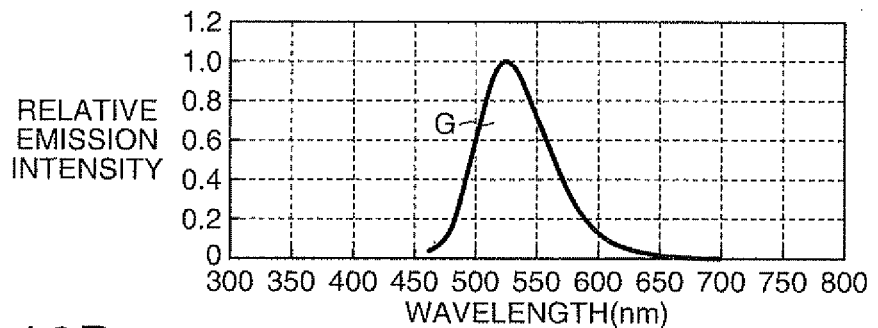
Figure 10D:
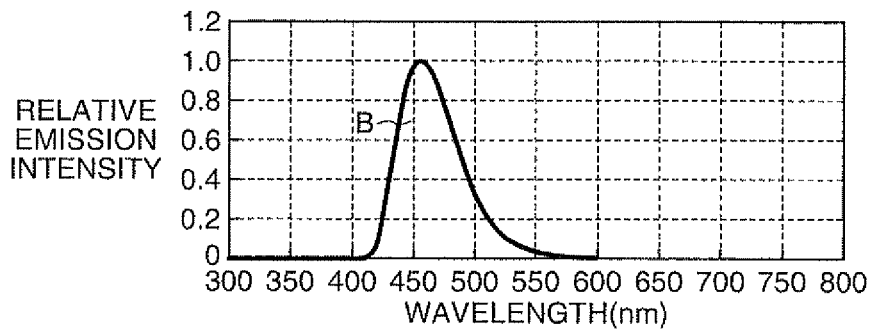

FIGS. 10A through 10D are graphs showing the emission characteristics of a light source device 12 and a fluorescent layer 48 in the fifth embodiment. FIG. 10A is a graph showing the emission characteristics of the light source device 12, FIG. 10B is a graph showing the emission characteristics of a red fluorescent material included in the fluorescent layer 48, FIG. 10C is a graph showing the emission characteristics of a green fluorescent material included in the fluorescent material 48, and FIG. 10D is a graph showing the emission characteristics of the blue fluorescent material included in the fluorescent layer 48.

The projector 1008 according to the fifth embodiment basically has a configuration similar to the projector 1004 according to the third embodiment, but is different from the projector 1004 according to the third embodiment in the configuration of the illumination device. Specifically, as shown in FIGS. 9 and 10A through 10D, in the projector 1008 according to the fifth embodiment, the illumination device 108 is provided with a light source device 12 for emitting violet light as the excitation light, and emits white light as the illumination light. In accordance therewith, the projector 1008 according to the fifth embodiment is not provided with the second illumination device, and is different in the configuration of the color separation light guide optical system.

The light source device 12 is a laser source for emitting a violet light beam (having a peak emission intensity at a wavelength of 406 nm, see FIG. 10A), which is a laser beam, as the excitation light beam. What is denoted with the symbol V in FIG. 10A is a colored light component (the violet light beam) emitted by the light source device 12 as the excitation light beam.

The rotating fluorescent plate 36 basically has substantially the same configuration as that of the rotating fluorescent plate 34 in the third embodiment, but is different in the fluorescent layer. The fluorescent layer 48 in the rotating fluorescent plate 36 is formed of a layer including the red fluorescent material for absorbing the violet light and emitting the red light, the green fluorescent material for absorbing the violet light and emitting the green light, and the blue fluorescent material for absorbing the violet light and emitting the blue light. The red fluorescent material is made of, for example, $CaAlSiN_3$—$Si_2N_2O$:Eu. The green fluorescent material is made of, for example, $Ba_3Si_6O_{12}N_2$:Eu. The blue fluorescent material is made of, for example, $BaMgAl_{10}O_{17}$:Eu. It should be noted that the fluorescent materials are not limited to those described above, but any other fluorescent materials, which emit the respective colored light beams in accordance with the excitation light, can also be adopted.

The fluorescent layer 48 converts the violet light emitted by the light source device 12 into the red light, the green light, and the blue light as the fluorescent light, and then emits the fluorescent light (see FIGS. 10B through 10D). In FIGS. 10B through 10D, what is denoted with the symbol R is the colored light component emitted by the red fluorescent material as the red light, what is denoted with the symbol G is the colored light component emitted by the green fluorescent material as the green light, and what is denoted with the symbol B is the colored light component emitted by the blue fluorescent material as the blue light.

The color separation light guide optical system 200 in the fifth embodiment has substantially the same configuration as that of the color separation light guide optical system 200 in the first embodiment, and therefore, the explanation therefor will be omitted.

As described above, although different from the case of the illumination device 104 according to the third embodiment in that the light source device for emitting the violet light is provided and in that the white light is emitted as the illumination light, since the illumination device 108 according to the fifth embodiment is provided with the light source device 12 for emitting the excitation light (the violet light), and the rotating fluorescent plate 36 provided with the fluorescent layer 48 for converting a part or the whole of the excitation light into the fluorescent light that includes two or more colored light beams (the red light and the green light), it becomes possible to obtain a plurality of colored light beams using the light source device 12 for emitting the excitation light similarly to the illumination device 104 according to the third embodiment.

Further, according to the illumination device 108 related to the fifth embodiment, since the rotating fluorescent plate 36 provided with the single fluorescent layer 48 is used, it becomes possible to make the manufacturing process of the rotating fluorescent plate 36 relatively easy similarly to the illumination device 104 according to the third embodiment.

Further, according to the illumination device 108 related to the fifth embodiment, since there is used the rotating fluorescent plate having the single fluorescent layer 48 formed continuously along the circumferential direction of the circular disk 40, it results in that the same colored light beam is always emitted from the illumination device 108, and as a result, it becomes possible for the illumination device 108 to be applied to the liquid crystal projector of the non-colorsequential type having no color breakup phenomenon and strong characteristics similarly to the illumination device 104 according to the third embodiment.

Further, according to the illumination device 108 related to the fifth embodiment, since there is provided the rotating fluorescent plate 36 obtained by providing the single fluorescent layer 48 to the rotatable circular disk 40, the heat generated in the fluorescent layer 48 due to the irradiation with the excitation light can be radiated in a large area along the circumferential direction, and as a result, it becomes possible to prevent the deterioration of the fluorescent layer 48 and the degradation of the luminous efficiency due to the overheat of the fluorescent layer 48 similarly to the illumination device 104 according to the third embodiment.

Further, according to the illumination device 108 related to the fifth embodiment, since the light source device 12 emits the violet light, and the fluorescent layer 48 converts the violet light emitted from the light source device 12 into the fluorescent light that includes the red light, the green light, and the blue light, and then emits the respective light beams, it becomes possible to emit the white light from the illumination device 108 using the light source device 12 for emitting the violet light.

It should be noted that the illumination device 108 according to the fifth embodiment has substantially the same configuration as that of the illumination device 104 according to the third embodiment in other points than the points that the light source device for emitting the violet light is provided and that the white light is emitted as the illumination light, and therefore, obtains the corresponding advantages out of the advantages that the illumination device 104 according to the third embodiment has.

Although different from the case of the projector 1004 according to the third embodiment in, for example, the configuration of the illumination device, according to the projector 1008 related to the fifth embodiment, since the illumination device 108 is provided, there can be obtained the projector capable of obtaining a plurality of colored light beams using the light source device 12 for emitting the excitation light, capable of making the manufacturing process of the rotating fluorescent plate 36 relatively simple, and being realized as a liquid crystal projector similarly to the case of the projector 1004 according to the third embodiment.

Further, according to the projector 1008 related to the fifth embodiment, since the light source device 12 emits the violet light, and the fluorescent layer 48 converts the violet light emitted from the light source device 108 into the fluorescent light including the red light, the green light, and the blue light, and then emits the respective light beams, it becomes possible to project a full-color image using the light source device 12 for emitting the violet light.

Although the invention is explained hereinabove based on the embodiments described above, the invention is not limited to the embodiments described above. The invention can be put into practice in various forms within the scope and spirit of the invention, and the following modifications are also possible, for example.

Figure 11A:
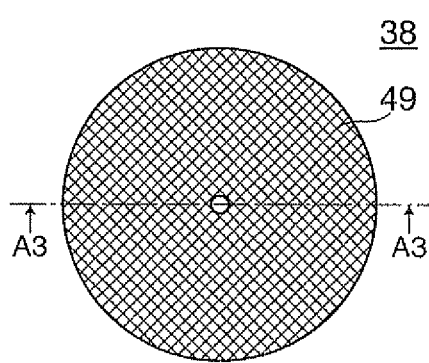
FIGS. 11A and 11B are diagrams for explaining a rotating fluorescent plate in a modified example.
Figure 11B:
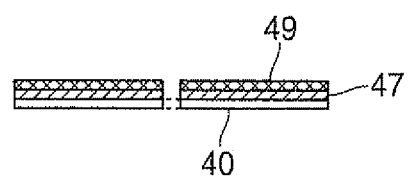

1. Although in each of the embodiments described above, the rotating fluorescent plate having the fluorescent layer 42 formed in a part of the circular disk 40 is used, the invention is not limited thereto. FIGS. 11A and 11B are diagrams for explaining the rotating fluorescent plate 38 in the modified example. FIG. 11A is a front view of the rotating fluorescent plate 38, and FIG. 11B is a cross-sectional view along the line A3-A3 shown in FIG. 11A. For example, as shown in FIGS. 11A and 11B, it is also possible to use the rotating fluorescent plate having the fluorescent layer formed on the entire surface of the circular disk.

2. Although in the first embodiment described above, there are used the light source device 10 for emitting the blue light and the fluorescent layer 42 for converting a part of the blue light emitted from the light source device 10 into the light including the red light and the green light, and transmitting a part of a remaining part of the blue light without performing the conversion, the invention is not limited thereto. For example, it is also possible to use a light source device for emitting violet light or ultraviolet light, and a fluorescent layer for converting the violet light or the ultraviolet light emitted from the light source device into the light including the red light, the green light, and the blue light.

3. Although in the fifth embodiment there are used the light source device 12 for emitting the violet light, and the fluorescent layer 48 for converting the violet light emitted from the light source device 12 into the fluorescent light including the red light, the green light and the blue light, the invention is not limited thereto. For example, it is also possible to use a light source device for emitting ultraviolet light, and a fluorescent layer for converting the ultraviolet light emitted from the light source device into the light including the red light, the green light and the blue light.

4. Although in each of the embodiments described above, the convex lenses are used as the first lens and the second lens in the collimating optical system, the invention is not limited thereto. In essence, is sufficient to use the first lens and the second lens with which the collimating optical system has the function of roughly collimating the light. Further, the number of lenses constituting the collimating optical system can be one, or three or more. The same can be applied to the collimating light collection optical system in each of the third through fifth embodiments.

5. Although in each of the embodiments described above, the convex lenses are used as the first lens and the second lens in the light collection optical system, the invention is not limited thereto. In essence, it is sufficient to use the first lens and the second lens with which the light collection optical system has the function of roughly focusing the light. Further, the number of lenses constituting the light collecting optical system can be one, or three or more.

6. Although in each of the third through fifth embodiments described above, the rotating fluorescent plate having the fluorescent layer formed on the circular disk via a reflecting film is used, the invention is not limited thereto. For example, the rotating fluorescent plate having the fluorescent layer formed directly on the circular disk, which is made of a material that reflects the visible light, can also be used.

7. Although in each of the second through fifth embodiments described above, the second illumination device provided with the scattering plate is used, the invention is not limited thereto. The second illumination device without the scattering plate can also be used.

8. Although in each of the embodiments described above, the light source device and the second light source device each formed of the laser source are used, the invention is not limited thereto. For example, it is also possible to use the light source device and the second light source device each composed of a light emitting diode or a light source lamp for emitting a specific colored light. Further, it is also possible to use the light source device and the second light source device formed of the respective types of devices different from each other.

9. Although in each of the embodiments described above the explanation is presented showing, as an example, the projector using three liquid crystal light modulation devices as the liquid crystal light modulation device, the invention is not limited thereto. The invention can also be applied to the projector using one, two, or four or more liquid crystal light modulation devices.

10. Although in each of the embodiments described above the transmissive projector is used, the invention is not limited thereto. For example, it is also possible to use a reflective projector. It should be noted here that "transmissive" denotes that the light modulation device as the light modulation section is a type of transmitting a light beam such as a transmissive liquid crystal display device, and "reflective" denotes that the light modulation device as the light modulation section is a type of reflecting a light beam such as a reflective liquid crystal display device. Also in the case in which the invention is applied to the reflective projector, the same advantages as in the case with the transmissive projector can be obtained.

11. The invention can be applied to a front projection projector for performing projection from the side of observing the projected image, and also to a rear projection projector for performing projection from the side opposite to the side of observing the projected image.

12. Although in each of the embodiments, the example of applying the illumination device according to the invention to the projector is explained, the invention is not limited thereto. For example, the illumination device according to the invention can also be applied to other optical equipment (e.g., an optical disk device, a headlight of a vehicle, and an illumination device).

The entire disclosure of Japanese Patent Application No. 2010-62090, filed on Mar. 18, 2010 is expressly incorporated by reference herein.

What is claimed is:

1. An illumination device comprising:
  a light source device adapted to emit an excitation light beam; and
  a rotating fluorescent plate having a single fluorescent layer formed on a circular disk, which can be rotated by a motor, continuously along a circumferential direction of the circular disk, the single fluorescent layer converting a part or whole of the excitation light beam into a fluorescent light beam that includes two or more colored light beams and emitting the two or more colored light beams simultaneously.

2. The illumination device according to claim 1, wherein the light source device emits a blue light beam as the excitation light beam, and the fluorescent layer converts a part of the blue light beam emitted from the light source device into the fluorescent light beam that includes a red light beam and a green light beam, and transmits a part of a remaining part of the blue light beam without performing the conversion.

3. A projector comprising:
  the illumination device according to claim 2;
  a light modulation device adapted to modulate an illumination light beam emitted from the illumination device in accordance with image information; and
  a projection optical system adapted to project a modulated light emitted from the light modulation device as a projection image.

4. The illumination device according to claim 1, wherein the light source device emits one of a violet light beam and an ultraviolet light beam as the excitation light beam, and
  the fluorescent layer converts the one of the violet light beam and the ultraviolet light beam emitted from the light source device into the fluorescent light beam that includes a red light beam, a green light beam and a blue light beam.

5. A projector comprising:
  the illumination device according to claim 4;
  a light modulation device adapted to modulate an illumination light beam emitted from the illumination device in accordance with image information; and
  a projection optical system adapted to project a modulated light emitted from the light modulation device as a projection image.

6. The illumination device according to claim 1, wherein the light source device emits a blue light beam as the excitation light beam, and
  the fluorescent layer converts the blue light beam emitted from the light source device into the fluorescent light beam that includes a red light beam and a green light beam.

7. A projector comprising:
  the illumination device according to claim 6;
  a second illumination device adapted to emit a blue light beam;
  a light modulation device adapted to modulate an illumination light beam emitted from the illumination device in accordance with image information; and
  a projection optical system adapted to project a modulated light emitted from the light modulation device as a projection image.

8. The projector according to claim 7, further comprising:
  a colored light beam combining element adapted to combine the blue light beam emitted from the second illumination device and the red light beam and the green light beam emitted from the rotating fluorescent plate with each other.

9. The projector according to claim 7, wherein the second illumination device includes
  a second light source device adapted to emit the blue light beam, and
  a scattering plate adapted to scatter the light beam emitted from the second light source device at a predetermined scattering intensity.

10. The illumination device according to claim 1, wherein the circular disk is made of a material transmitting the excitation light beam,
  the fluorescent layer is formed on the circular disk via a dichroic film adapted to transmit the excitation light beam and to reflect the fluorescent light beam, and the excitation light beam is arranged to enter the rotating fluorescent plate from a side of the circular disk.

11. A projector comprising:
the illumination device according to claim 10;
a light modulation device adapted to modulate an illumination light beam emitted from the illumination device in accordance with image information; and
a projection optical system adapted to project a modulated light emitted from the light modulation device as a projection image.

12. The illumination device according to claim 1, wherein
the fluorescent layer is formed on the circular disk via a reflecting film adapted to reflect a visible light beam, and
the excitation light beam is arranged to enter the rotating fluorescent plate from a side of the fluorescent layer.

13. A projector comprising:
the illumination device according to claim 12;
a light modulation device adapted to modulate an illumination light beam emitted from the illumination device in accordance with image information; and
a projection optical system adapted to project a modulated light emitted from the light modulation device as a projection image.

14. The illumination device according to claim 1, further comprising:
a light collection optical system disposed in a light path from the light source device to the rotating fluorescent plate, and adapted to make the excitation light beam enter the fluorescent layer in a roughly focused state.

15. A projector comprising:
the illumination device according to claim 14;
a light modulation device adapted to modulate an illumination light beam emitted from the illumination device in accordance with image information; and
a projection optical system adapted to project a modulated light emitted from the light modulation device as a projection image.

16. The illumination device according to claim 1, wherein
the rotating fluorescent plate rotates at a rotational speed at which a focused spot of the excitation light beam moves on the fluorescent layer at a predetermined relative speed in a range of 5 msec through 50 msec.

17. A projector comprising:
the illumination device according to claim 16;
a light modulation device adapted to modulate an illumination light beam emitted from the illumination device in accordance with image information; and
a projection optical system adapted to project a modulated light emitted from the light modulation device as a projection image.

18. The illumination device according to claim 1, wherein
the light source device is formed of a laser source.

19. A projector comprising:
the illumination device according to claim 1;
a light modulation device adapted to modulate an illumination light beam emitted from the illumination device in accordance with image information; and
a projection optical system adapted to project a modulated light emitted from the light modulation device as a projection image.

20. An illumination device according to claim 1 comprising:
a light source device adapted to emit an excitation light beam; and
a rotating fluorescent plate having a single fluorescent layer formed on a circular disk, which can be rotated by a motor, continuously along a circumferential direction of the circular disk, an entirety of the single fluorescent layer adapted to convert a part or whole of the excitation light beam into a fluorescent light beam that includes two or more colored light beams.

* * * * *